(12) United States Patent
Maggi et al.

(10) Patent No.: US 11,598,920 B2
(45) Date of Patent: Mar. 7, 2023

(54) OPTO-MECHANICAL TRANSDUCER APPARATUS AND CORRESPONDING METHOD

(71) Applicant: STMicroelectronics S.r.l., Agrate Brianza (IT)

(72) Inventors: Luca Maggi, Garlate (IT); Mark Andrew Shaw, Milan (IT)

(73) Assignee: STMicroelectronics S.r.l., Agrate Brianza (IT)

(*) Notice: Subject to any disclaimer, the term of this patent is extended or adjusted under 35 U.S.C. 154(b) by 11 days.

(21) Appl. No.: 17/326,955

(22) Filed: May 21, 2021

(65) Prior Publication Data

US 2021/0382332 A1 Dec. 9, 2021

(30) Foreign Application Priority Data

Jun. 5, 2020 (IT) .................... 102020000013462

(51) Int. Cl.
*G02B 6/32* (2006.01)
*G02F 1/01* (2006.01)
*G02B 6/028* (2006.01)
*G01L 9/00* (2006.01)

(52) U.S. Cl.
CPC .............. *G02B 6/32* (2013.01); *G01L 9/0023* (2013.01); *G02B 6/028* (2013.01); *G02F 1/0134* (2013.01)

(58) Field of Classification Search
CPC ........ G01L 9/0023; G02B 6/32; G02B 3/0087
See application file for complete search history.

(56) References Cited

U.S. PATENT DOCUMENTS

| 4,991,150 A * | 2/1991 | Wixom .................. G01H 11/08 |
| | | 381/172 |
| 5,105,665 A * | 4/1992 | Parsons ................. G01L 9/0023 |
| | | 73/DIG. 1 |

FOREIGN PATENT DOCUMENTS

CN 110488340 A 11/2019

OTHER PUBLICATIONS

Search Report and Opinion for application EP 21176460.0, dated Nov. 9, 2021. (Year: 2021).*
Andrews, R. W., et al., "Bidirectional and efficient conversion between microwave and optical light", Nature Physics, vol. 10, Mar. 23, 2014, 17 pages.

(Continued)

*Primary Examiner* — Michael Stahl
(74) *Attorney, Agent, or Firm* — Slater Matsil, LLP

(57) ABSTRACT

An embodiment apparatus comprises an optically transparent substrate having first and second surfaces; a piezoelectric membrane, arranged at the first surface, that oscillates in response to a light beam propagated through the substrate; at least one reflective facet facing the substrate and arranged at the piezoelectric membrane; and an optical element receiving the light beam at an input end and guiding the light beam towards an output end coupled to the second surface. The optical element incorporates a light focusing path focusing the light beam at a focal point at the piezoelectric membrane, and at least one light collimating path collimating the light beam onto the at least one reflective facet. The optical element guides light reflected from the at least one reflective facet to the input end, the reflected light indicating a position of the optical element with respect to the focal point.

26 Claims, 8 Drawing Sheets

(56) References Cited

OTHER PUBLICATIONS

Bagci, T., et al., "Optical detection of radio waves through a nanomechanical transducer", Nature, vol. 507, Macmillan Publishers Limited, Mar. 6, 2014, pp. 81-85.

Midolo, L., et al., "Nano-opto-electro-mechanical systems", ResearchGate, https://www.researchgate.net/publication/322341324, in Nature Nantechnology, Jan. 2018, 28 pages.

Simonsen, Anders et al., "Sensitive optomechanical transduction of electric and magnetic signals to the optical domain", Optics Express 18561, vol. 27, No. 13, Jun. 2019, 18 pages.

Van Buren, Martin et al., "Foundations for low-loss fiber gradient-index lens pair coupling with the self-imaging mechanism", Applied Optics, vol. 42, No. 3, Jan. 20, 2003, pp. 550-565.

\* cited by examiner

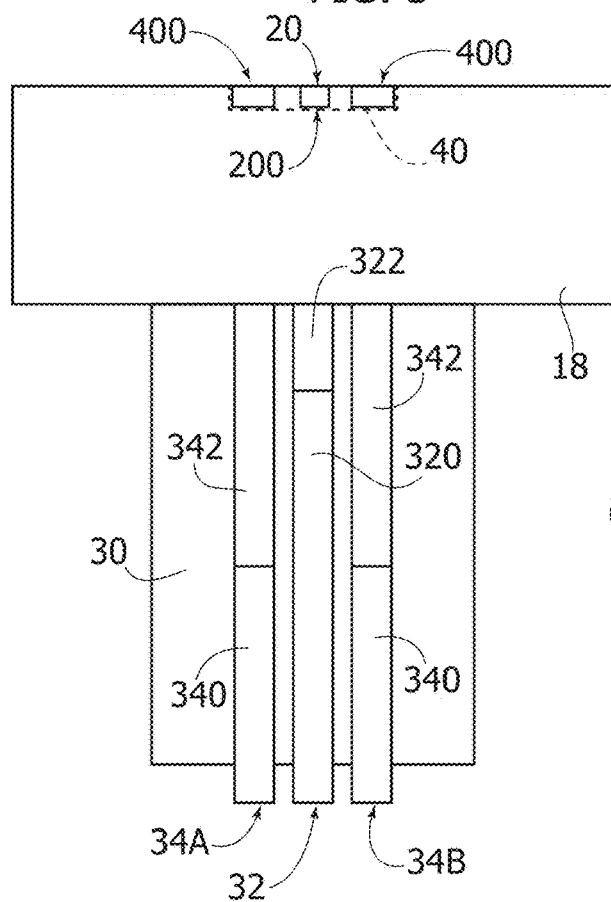
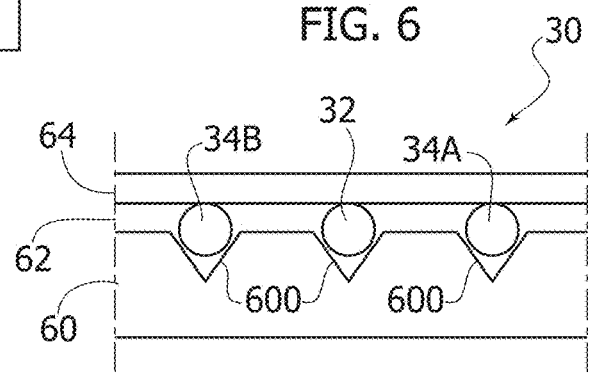
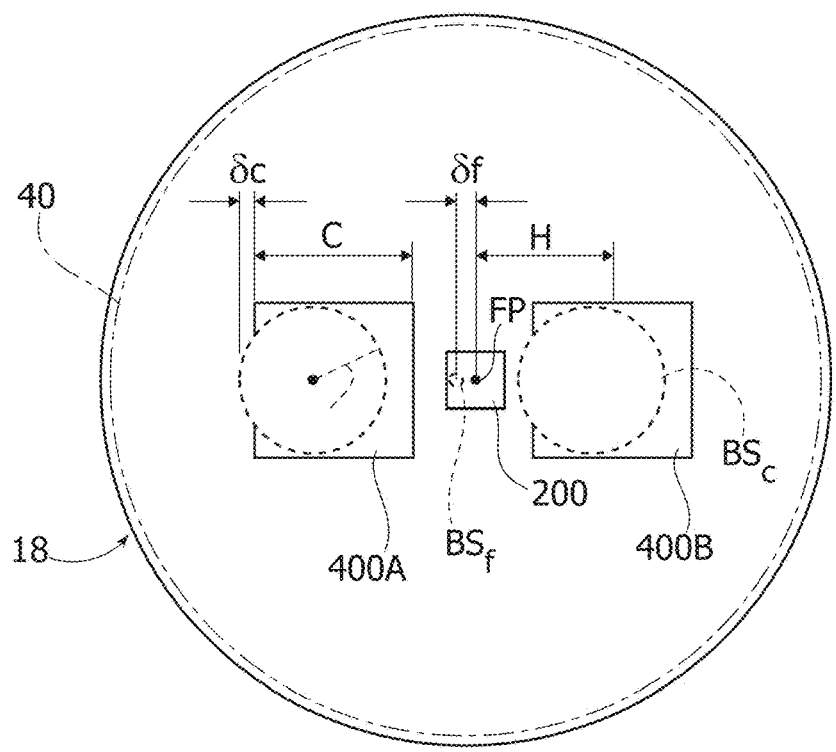

OPTO-MECHANICAL TRANSDUCER APPARATUS AND CORRESPONDING METHOD

CROSS-REFERENCE TO RELATED APPLICATIONS

This application claims the benefit of Italian Application No. 102020000013462, filed on Jun. 5, 2020, which application is hereby incorporated herein by reference.

TECHNICAL FIELD

The description relates to opto-mechanical systems. One or more embodiments may be used for optical alignment.

BACKGROUND

Micro-opto-electromechanical systems (MOEMS), also known as optical microelectromechanical systems or optical MEMS, are systems involving sensing or manipulating optical signals, on a very small size scale, using integrated mechanical, optical, and electrical systems, coupling a mechanical mode to a light mode and vice versa, for instance.

Such a type of systems is discussed, for instance, in Midolo, L., Schliesser, A. and Fiore, A.: "Nano-opto-electromechanical systems", Nature Nanotech 13, 11-18 (2018), doi: 10.1038/s41565-017-0039-1.

An opto-mechanical sensor may transduce mechanical movement of a membrane (on a micrometer scale) into an optical signal and vice versa.

For instance, an opto-mechanical sensor may comprise an oscillating nano- or micro-membrane with a light beam focused on an active area of the membrane, that is, the area where the opto-mechanical transduction may be maximum. Such an active area may be arranged, for instance, at the center of the die, or at any other portion thereof.

Such a type of sensor is disclosed, for instance, in A. Simonsen, S. Saarinen, J. Sanchez, J. Ardenkjær-Larsen, A. Schliesser, and E. Polzik: "Sensitive optomechanical transduction of electric and magnetic signals to the optical domain," Opt. Express 27, 18561-18578 (2019).

In membrane-based opto-mechanical sensors of this type, the light beam used is focused up to reaching a target spot size, e.g., of the order of micrometers.

As a result, optical alignment between (a focal point of) the focused light beam and the (active) area of the membrane is a relevant figure of merit.

Optical alignment using a focused beam may be challenging for various reasons, such as a difficulty in precisely determining a correct position for the minimum waist point of the light beam, which may result in poor performance and a difficulty in optimizing alignment; and complexity of the search algorithms for a best alignment.

Conventional optical alignment arrangements using a focused beam may involve a complex reading process, including performing a scan along X and Y axes for each position along the optical propagation direction (usually referred to as the Z axis); analyzing all the data in order to find a correct focusing depth; setting the system to a certain focusing depth; and performing a further scan for determining an improved alignment.

Conventional solutions as discussed in the foregoing thus suffer from the following drawbacks: complexity of alignment systems and methods; and costs in terms of time and consumption, as related to direct reading and feedback from the opto-electronic device/component.

SUMMARY

An object of one or more embodiments is to contribute in overcoming the drawbacks discussed in the foregoing.

According to one or more embodiments, such an object can be achieved by means of an electro-optical apparatus having the features set forth in the claims that follow.

One or more embodiments may relate to a corresponding optical alignment method.

The claims are an integral part of the technical teaching provided herein with reference to the embodiments.

One or more embodiments may comprise an optical element. A gradient-index, briefly GRIN, optical lens may be exemplary of such a lens.

One or more embodiments may offer one or more of the following advantages: use of a GRIN lens directly attached to a surface counters possible focusing misalignment errors; direct reading of the chip performances may become superfluous; optical alignment can be performed with standard equipment and procedures; and using reflected power of a collimated light beam for performing optical alignment may render reading chip performance superfluous, which simplifies the alignment process.

One or more embodiments may involve combining a GRIN lens with an optical buffer, so that the total length of the focusing and collimating system is the same.

One or more embodiments may involve reading the reflected power of a collimated beam, which facilitates "skipping" direct reading of the chip.

In one or more embodiments, advantageously, a focusing system and a collimating system may be placed in a same optical fiber block, so that the stability in relative positional arrangements is a function of the accuracy in the assembly of a single fiber block (approximately 1 micron).

In one or more embodiments, reflective geometries can be patterned on the chip, which facilitates providing optical fiducial marks, for instance.

BRIEF DESCRIPTION OF THE DRAWINGS

One or more embodiments will now be described, by way of non-limiting example only, with reference to the annexed Figures, wherein:

FIG. 5 is a cross-sectional view along line V-V of FIG. 4;

FIG. 6 is a cross-sectional view along line VI-VI of FIG. 4;

FIG. 7 is a plan view of FIG. 4;

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The headings/references used herein are provided merely for convenience and hence do not define the extent of protection or the scope of the embodiments.

For the ease of explanation, the drawings are in simplified form and are not to a precise scale.

Throughout the figures annexed herein, like parts or elements are indicated with like references symbols and a corresponding description will not be repeated for each and every figure for brevity.

Figure 1:
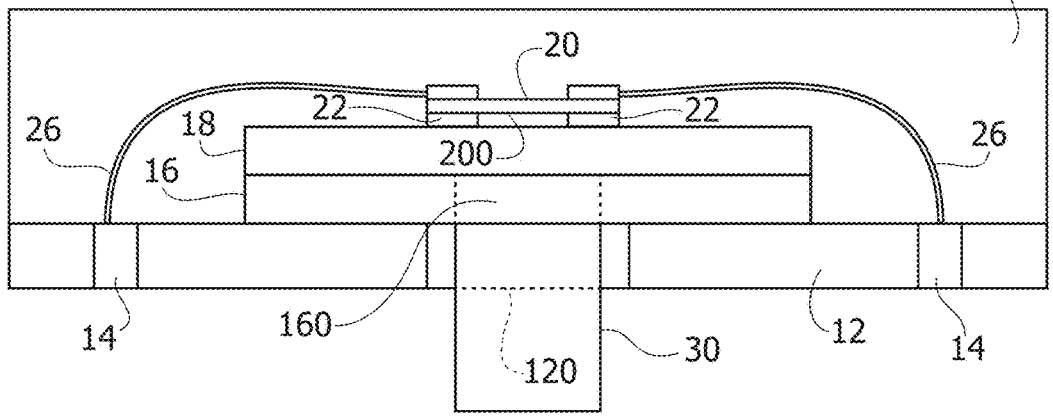
FIG. 1 is a cross-sectional view of an opto-mechanical transducer assembly.

An opto-mechanical transducer 10 as exemplified in FIG. 1 may comprise:

a housing 12, for instance a ceramic housing, comprising a base with a central hole 120, for instance, with a diameter about 4 mm (1 mm=$10^{-3}$ m=1 millimeter) and configured as a porthole to hold an optically transparent material, for instance made of glass having a thickness of 0.2 mm, forming an optical window;

a plurality of electrically conductive leads 14, for instance flat leads exposed at the surface of the housing 12;

one or more optically transparent layers 16, 18 for instance comprising a fused silica substrate 18 (about 0.5 mm thick), optionally superimposed on top of a silicon die 16 having an empty core 160 (aligned with the hole 120) where light may propagate in free space, the core 160 extending, for instance, about a thickness of 0.35 mm;

a membrane layer 20, for instance a piezoelectric membrane, located on a top planar surface of the silica die 18 and comprising an at least partially reflective "bottom" surface 200 facing towards the top planar surface of the silica die 18;

(micro-)spacers 22 configured to hold the membrane layer 20 separate from the top planar surface of the silica die 18 so as to allow the membrane to vibrate or oscillate;

electrically conductive contact pads 24 coupled on a top surface of the membrane layer 20 and configured to control and/or detect variations of opto-mechanical properties of the membrane 20 via electrical signals transmitted therefrom or received thereto;

electrically conductive wires 26 coupling the electrically conductive contact pads 24 on the membrane layer 20 to electrically conductive leads 14 in the support base 12; and an optical element 30 such as a lens, configured to guide light emitted from a source at an input end (not visible in the figure) of the optical element 30 along an optical path aimed towards the membrane 20, the optical element 30 is coupled to the package base 12 via the porthole 120 therein. For instance, the optical element may have a diameter about 2.5 mm and a length about the same size.

As exemplified in FIG. 1, the apparatus 10 may be (hermetically) sealed via a casing 90, such as a lid, for instance.

In one or more embodiments, the opto-mechanical apparatus 10 may transduce an optical signal to an electric signal via mechanical vibration of the membrane layer 20 when light is focused thereon.

Figure 2:
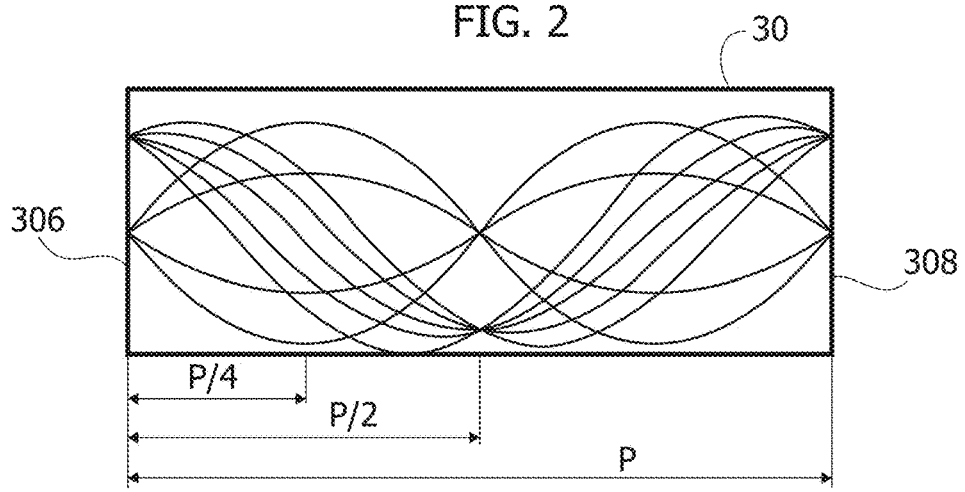
FIGS. 2, 2A and 2B are diagrams of principles underlying one or more embodiments.

A GRIN lens as illustrated in FIG. 2 is exemplary of an optical element 30 which can be advantageously used in embodiments as discussed herein.

Figure 2A:
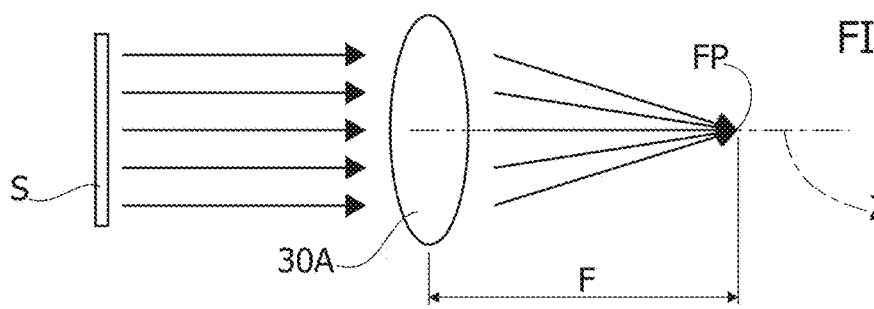

Byway of background, it may be recalled that an "optical object" 30A as shown in FIG. 2A, configured to focus a light beam with parallel rays from a light source S, "squeezing" it to a focal point FP at a certain focal depth or distance F from the object 30, is referred to as a focusing lens 30A. A corresponding position along a propagation axis Z wherein the light beam spot reaches its minimum radius is called "focal point" FP (or beam waist).

Figure 2B:
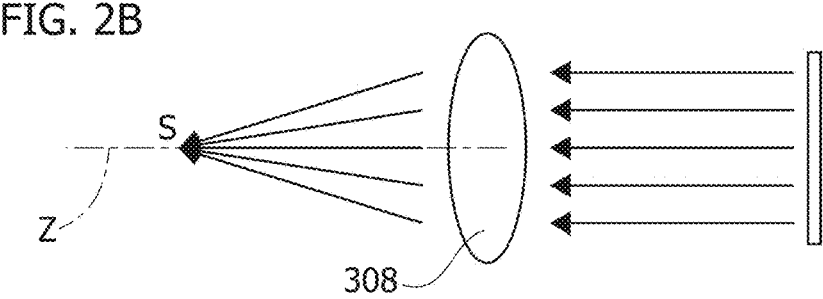

Conversely, an optical object 30B as shown in FIG. 2B, which receives a diverging beam from a source S and generates a beam with no angular divergence left (in a notionally ideal scenario) or with a Gaussian behavior (in a more realistic scenario), is referred as a collimating lens 30B. A collimating lens 30B may have a collimating length, that is, the distance between the source S and the lens 30B such that the beam from the light source is collimated.

A GRIN lens 30 as exemplified in FIG. 2 may comprises a cylindrical or rod-like body, extending linearly (that is, longitudinally) between two flat ends 306, 308, suitable for fiber coupling.

The optical behavior of a GRIN lens 30 may be based on the refractive index of the lens material, which varies spatially with a gradient profile, in ways per se known to those of skill in the art.

FIG. 2 shows a diagram of ray traces within a GRIN rod 30 designed to operate as a focusing lens. The linear rod-like body 30 may have a length, also indicated as one "pitch" P, that is, the length for obtaining a 1:1 image without reversing which is related to the refractive index variation of each GRIN lens.

As known to those of skill in the art, a GRIN lens may behave as a focusing lens or a collimating lens (or as a diverging lens) as a function of its pitch P.

For instance, shortening the rod to a fractional length of ½ or ¼ of the full pitch P, as exemplified in FIG. 2 with inverted arrows, may vary the optical properties of the optical element 30.

In an apparatus 10 as exemplified in FIG. 1, a GRIN lens may be used at 30 in order to focus a light beam (as exemplified in FIG. 2A) on the membrane bottom surface 200.

On the other hand, as discussed previously, accurately aligning a focused light beam so that its waist is at a position corresponding to the bottom surface 200 may be a challenging task.

Figure 3:
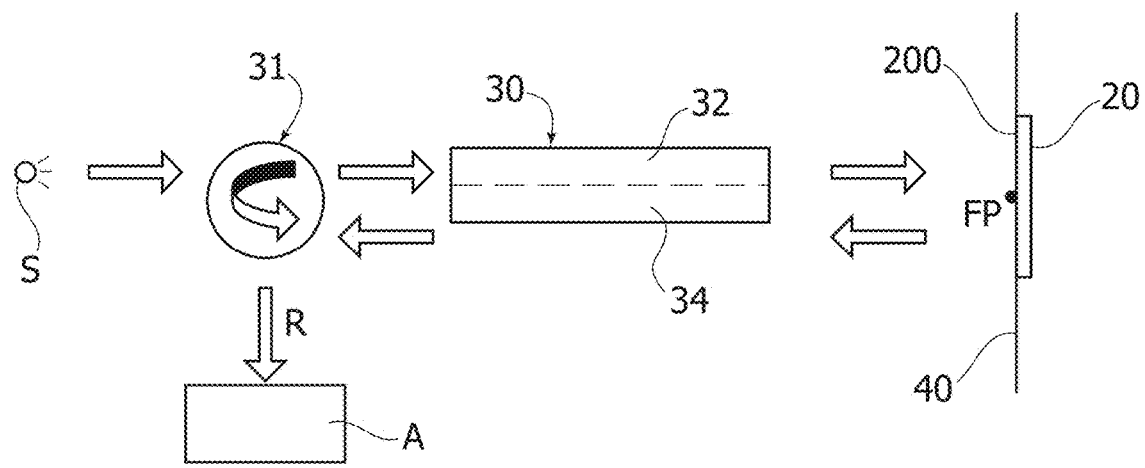
FIG. 3 is a diagram of an optical alignment method as exemplified herein.

As exemplified in FIG. 3, one or more embodiments may use an optical element 30 based on the GRIN lens concept which includes a focusing lens portion 32 and a collimating lens portion 34 embedded in a single optical piece, for instance in a single (light) fiber block.

Such an optical element 30 may be designed so that both the focusing lens portion 32 and the collimating lens portion 34 have respective (focal) lengths F correlated therebetween, for instance thanks to being formed together in a single fiber block with a certain length.

Such an optical element 30, as exemplified in FIG. 3, may be used in co-operation with a reference reflective surface 40, for instance included in the membrane layer 20 as a peripheral portion 400 surrounding a center portion 200 of its bottom surface or patterned as a non-connected reflective surface, operating as fiducial mark. Such a reference reflective surface 40, co-planar with the bottom surface of the membrane 20, may facilitate performing an improved optical alignment of the focal length F of the focusing lens portion 32.

For instance, a light beam emitted by the light source S may be concurrently focused 32 and collimated 34 when traveling through the optical element 30. As a result, a collimated ray of light provided therefrom may impinge onto the reflective reference surface 40.

At least a part of the impinging collimated ray will be reflected from the reflective reference surface 40. Such a reflected ray of light R may travel backwards along the optical element 30 with the capability of being sensed, for instance via an optical circulator 31 arranged at the "distal" end of the element 30 (that is the end facing away from the reflective surface 40). For instance, the circulator 31 may provide the reflected ray R to a user circuit A, for instance an actuator A, configured to perform a feedback on the alignment of the optical element 30 with respect to the reference surface 40.

Alignment of the collimating lens 34 may thus be facilitated thanks to a bigger spot size available at the focal point FP.

The focusing lens 32 being incorporated in a common optical assembly 30 together with the collimating lens 34 may therefore facilitate (in an essentially "passive" manner) simpler alignment for the focusing lens 32.

It is noted that the reflected light R provides a sort of passive alignment feedback, without per se activating the opto-mechanical transducer, that is, without electrically powering the apparatus 10.

As mentioned, such a passive alignment process is relatively quick and easy.

For instance, the optical element 30 can be attached (e.g., glued) directly to assembly 10 once aligned therewith.

Alternatively, it can be attached to the porthole 120 of the housing while the membrane 20 is assembled therein.

In an optical alignment system 30, 40 as exemplified in FIGS. 4 to 7, for instance, the reference surface 40 may comprise a plurality of planar reflective surfaces (or facets) 400A, 400B which may be symmetrically arranged with respect to the membrane layer 20, at a same distance from a target focal point FP of the active surface 200 of the membrane 20; and the optical element 30 may comprise a plurality of collimating lens portions 34A, 34B arranged mirror-symmetrically with respect to (an optical axis of) the focusing lens portion 32 of the optical element 30.

A "target" reference surface 40, 400 as discussed herein may be located on an exposed surface portion of the optically transparent layer 16, 18 of the assembly 10, such as a surface portion aligned with the hole 120 in the housing 12 of the apparatus 10.

For the sake of simplicity, in the following an arrangement of a pair of planar reflective surfaces (or facets) 400A, 400B and of a corresponding pair of collimating lens portions 34A, 34B is discussed. It is otherwise understood that such quantities in exemplary arrangements are in no way limiting, as virtually any number of planar reflective surfaces (or facets) 400A, 400B and collimating lens portions 34a, 34B may be used in one or more embodiments.

As exemplified in FIG. 5 (this is a cross-sectional view along line V-V of FIG. 4): the focusing lens portion 32 of the optical element 30 may be incorporated in an optical fiber comprising a focusing GRIN lens portion 320 and an optical spacer portion 322; and the pair of collimating lens portions 34A, 34B may comprise a first collimating lens portion 34A and a second collimating lens portion 34B, each comprising a collimating GRIN lens portion 340 and a further optical spacer portion 342.

For a certain light wavelength, a focusing GRIN lens 320 may be obtained for a certain pitch P, e.g., P=500 microns, while a collimating GRIN lens 340 may be obtained for a fraction of the pitch, e.g., P'=½*P.

As the collimating lenses 340 are shorter than the focusing lens 320, the collimating GRIN lenses 340 may be coupled to an optical spacer or "buffer", so that the total length Lo given by the sum of the length of the respective lens 340, 342 and the length of the respective spacer 342, 344 is the same for both the focusing 32 and collimating 34A, 34B portions, facilitating coupling the optical element 30 to the light source S and to the optically transparent layer 18.

Use of GRIN lenses 320, 340 having different pitch lengths may provide an advantageously easy assembly of the optical component 30 and may facilitate reaching the target spot size with the focal point FP at the central surface 200 of the membrane 20.

As exemplified in FIG. 6 (this is a cross-sectional view along line VI-VI of FIG. 4), the optical fibers embedding the focusing portion 32 and collimating portions 34A, 34B, respectively, may be assembled in a housing comprising: a support layer 60 comprising a number of V-grooves 600 wherein the fibers 32, 34A, 34B can be arranged each received in a respective V-groove (in manner known to those of skill in the art); a lid layer 64, configured to be arranged on the fibers 32, 34A, 34B to retain them in the respective V-grooves 600; and a filling layer 62, for instance a layer of an epoxy resin, sandwiched between the support layer 60 and the lid layer 64, and filling the interstitial spaces between the V-grooves 600, the fibers 32, 34A, 34B and the lid layer 64.

Figure 4:
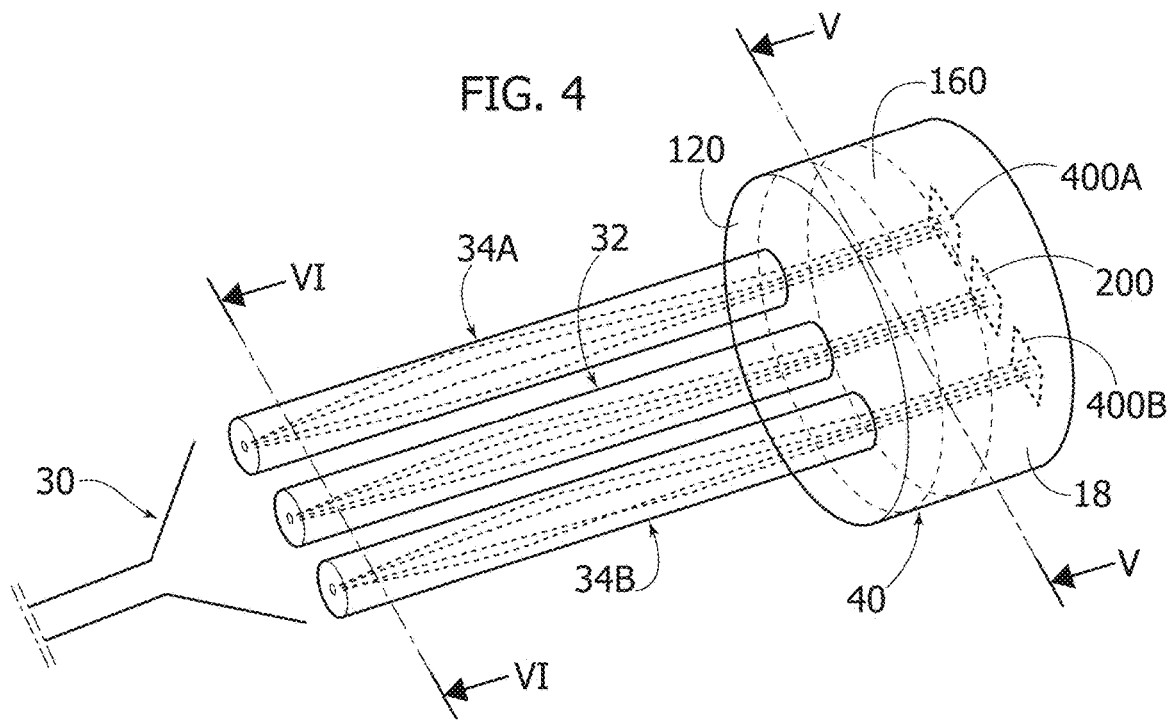
FIG. 4 is a perspective view of an alignment system as per the present disclosure.

FIG. 7 is an exemplary plan view of FIG. 4, showing the fiducial areas 400A, 400B, for instance two metallic square areas 400A, 400B having a side length C and whose centers are located at a same distance H from the central area 200 of the membrane 20 target for the focal point FP.

For instance, the distance H may have a value of approximately 500 microns.

FIG. 7 also shows, represented with dashed lines superimposed on the reference reflective areas 400A, 400B and 20, spot sizes BSf, BSc output from the focusing portion 32 and collimating portion 34 of the optical element 30, respectively.

For instance, as exemplified in FIG. 7: the focused beam spot size BSf may reach a waist size below 20 μm, ideally 10 μm (1 μm=$10^{-6}$ m=1 micron); and the collimated beams spot sizes BSc may be about 300 μm at the respective fiducial area 400A, 400B.

During optical alignment operations, an alignment error δc of the collimated beam BSc with respect to the reference areas 400A, 400B may be detected thanks to the signal R back-reflected from the reflective surfaces of the reference reflective areas 400A, 400B. Such an alignment error δc may be indicative of a corresponding alignment error δf of the focused beam with respect to the target focal point FP.

In one or more embodiments, the optical element 30 may be deemed to be aligned with respect to the reference surface 40 when the collimated beam spot size BSc fits (entirely) within the reference reflective areas 400A, 400B, that is when the alignment error δc is negligible, up to zero. As a result, also the focal point FP can be deemed to be aligned with respect to the target position, corresponding to a negligible (ideally, up to zero) focusing alignment error δf when the collimated beam spot size BSc fits entirely within the reference reflective areas 400A, 400B, that is when the collimation alignment error δc is negligible (ideally, up to zero).

Figure 8:
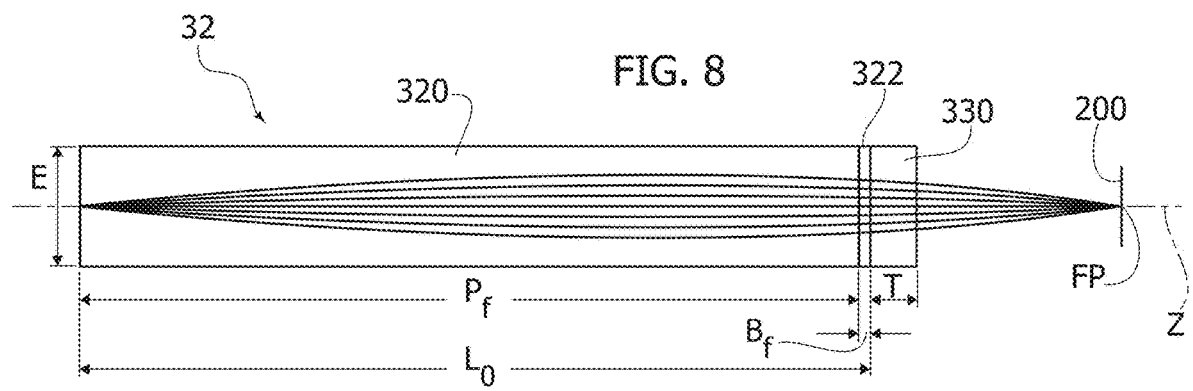
FIGS. 8, 8A, 9 and 9A are diagrams of optical principles underlying one or more embodiments.

FIG. 8 is an enlarged view of the focusing portion 32 of the optical element 30, showing ray traces of a light beam propagating therethrough and output at an optical interface 330, for instance an optical window having a certain thickness T.

As exemplified in FIG. 8, the focusing portion 32 may have a total length $L_o$ given by the sum of a length Pf of the focusing GRIN lens 320, for instance equal to a full pitch and about 500 micron, and a length Bf of the focusing buffer 322, for instance made of fused silica, e.g., $L_o$=Pf+Bf.

For instance, the GRIN lens 320 may have a substantially cylindrical shape with a constant diameter E, e.g., between 350 and 500 microns.

Figure 8A:
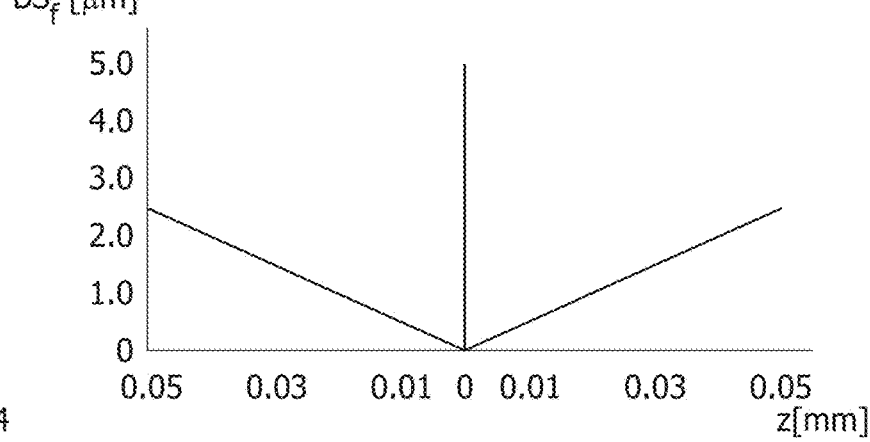

FIG. 8A is a diagram of a RMS focus beam spot size BSf, in microns, as a function of distance, in millimeters, from the ideal focal point FP taken as origin of the abscissa.

Figure 9:
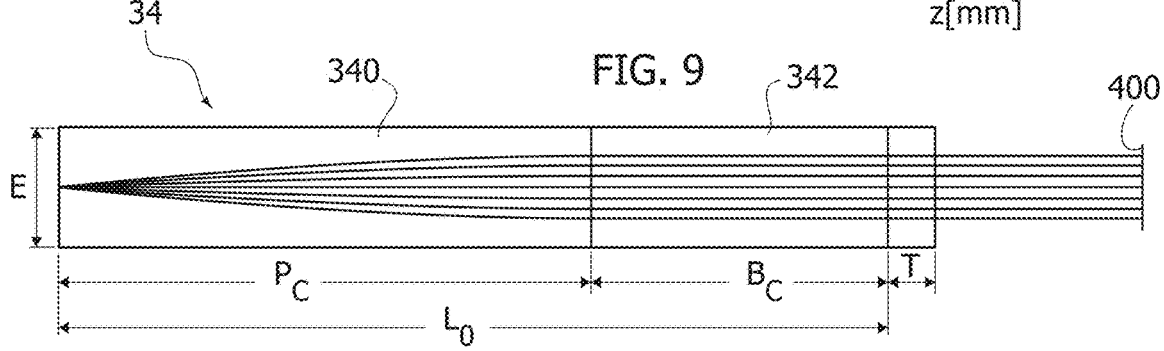

As exemplified in FIG. 9, the collimating portion 34 may have a total length $L_o$ given by the sum of a length Pc of the collimating GRIN lens 340, for instance about half of a lens pitch, and a length Be of the collimating buffer 342, for instance made of fused silica, e.g., $L_o$=Pc+Bc.

In one or more embodiments, such a total length Lo is the same for the focusing portion 32 and for the collimating portion 34, e.g., $L_o$=Pc+Bc=Pf+Bf.

For instance, the GRIN focusing lens 320 may have a respective length Pf about 5.35 mm, the collimating GRIN lens 324 may have a second length Pc about 3.07 mm with the optical buffer 342 having a third length Be about 2.28 mm, so that the total length Pc+Bc of the collimating GRIN lens and the collimating optical buffer 342 is equal to the length of focusing GRIN lens Pf.

Figure 9A:
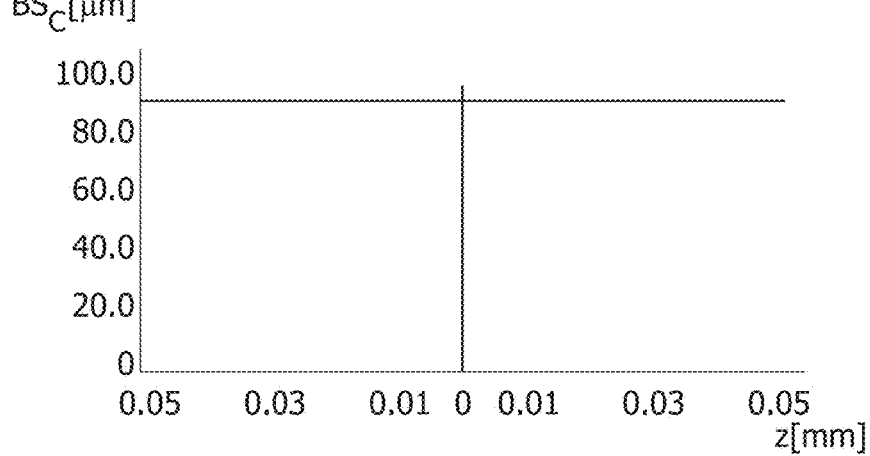

FIG. 9A is a diagram of an RMS collimated beam spot size BSc, in microns, as a function of distance, in millimeters, from the reference surface 40 taken as origin of the abscissa.

Figure 10:
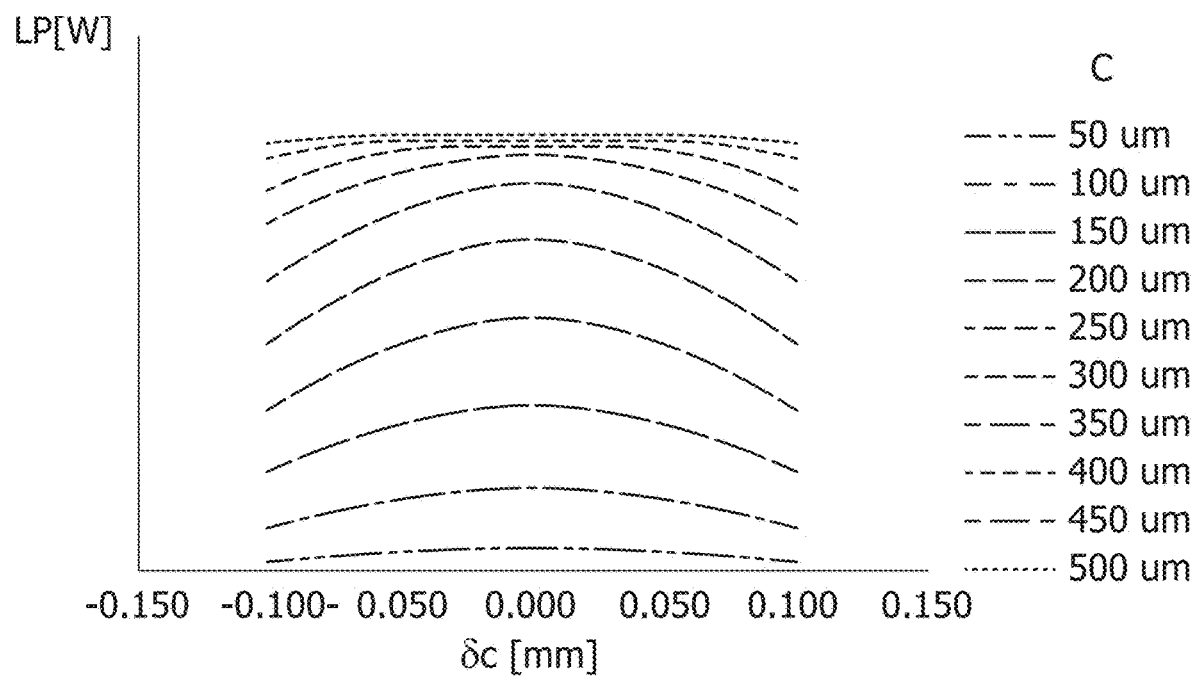
FIGS. 10 and 11 are diagrams of power distribution.

FIG. 10 is a diagram of the amount of optical power LP reaching one of the reference surfaces 40, 400, 400A, 400B as a function of the alignment error δc calculated for various values of the length C of the reference surface. In the example considered, the total power of the light launched into the optical element 30 is considered to be equal to 1 Watt, for the sake of simplicity in performing power loss computation.

Figure 11:
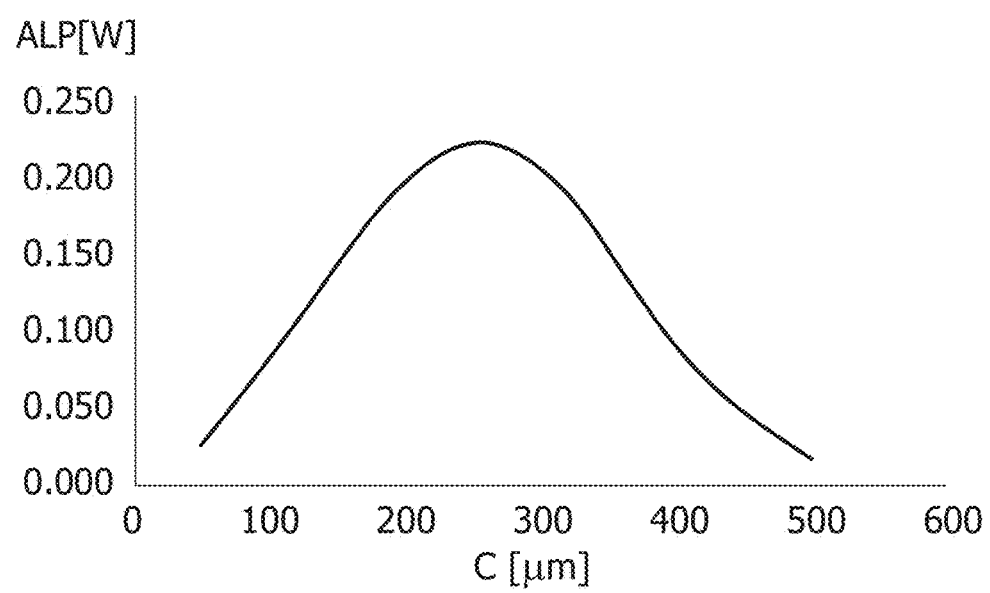

FIG. 11 is a diagram of the difference ΔLP between values of power at zero misalignment, e.g., δc=0, and power values with a maximum misalignment, e.g., δc=0.1 micron, plotted as a function of the corresponding reflective surface length C.

As exemplified in FIGS. 10 and 11, an increased accuracy in detecting misalignments may be obtained for values of the length C of the reflective surfaces 400A, 400B in a range between 250 and 300 microns, with 250 microns the nominal best value.

FIGS. 12 to 20 are illustrative of possible stages of assembling a sensor 10 along the lines discussed previously.

Figure 12:
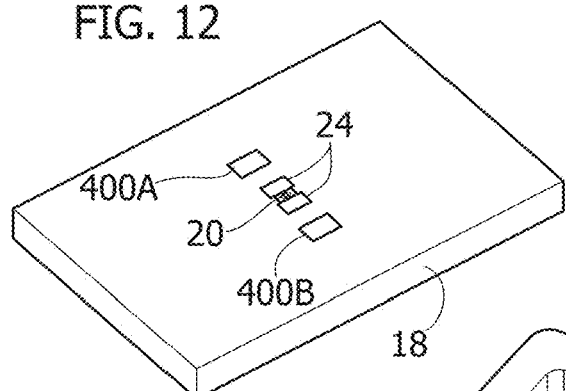
FIG. 12 is a perspective view of an assembly as exemplified herein.

As illustrated in particular in FIG. 12, such a sensor assembly 10 may comprise:

an optical chip layer 18, e.g., an optically transparent fused silica layer;

an active membrane 20, such as a nano membrane of piezoelectric material, for instance;

a pair of electrically conductive bonding pads 24 coupled to the membrane, where the working area of the membrane 20 is placed between bonding pads 24 which are configured to be used for providing electrical connection between leads and the membrane 20; and a pair of reference surfaces 400A, 400B symmetrically arranged at the sides of the membrane 20 so that their position with respect to membrane 20 is well defined, which may comprise metallic or other reflective coating provided in the chip by lithography, in a way per se known.

In one or more embodiments, the optical element 30 can be aligned directly with respect to the assembly 100 and coupled (e.g., glued) therewith.

Figure 13:
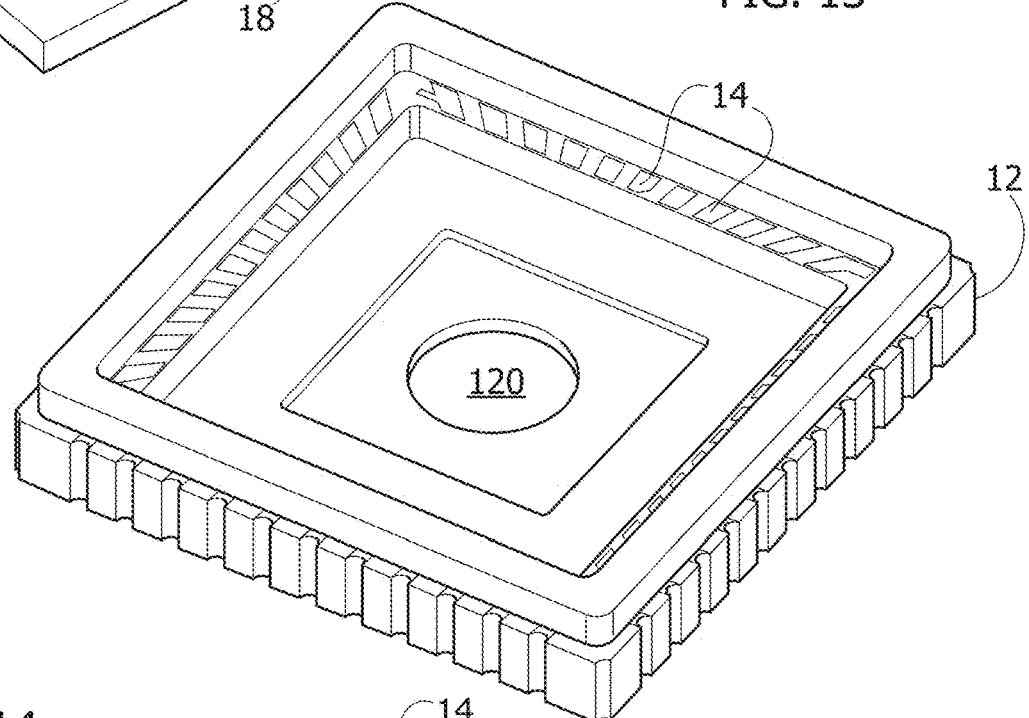
FIGS. 13 and 14 are perspective views of a housing as per the present disclosure.
Figure 14:
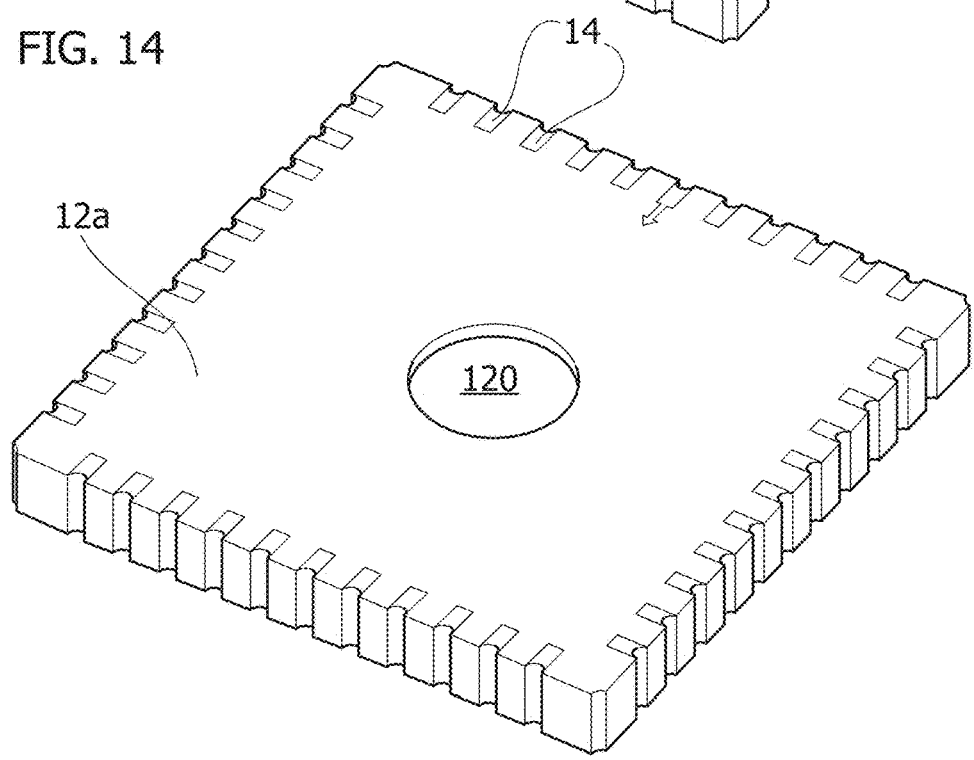

Alternatively, the assembly 10 may be included in a package 12 as exemplified in FIGS. 13, 14 having a glass window 120 and the optical element 30 can be coupled to such package window. For instance, the chip assembly of FIG. 12 may be mounted inside the package of FIGS. 13 and 14.

FIGS. 13 and 14 are exemplary of a (e.g., ceramic) chip support package 12 comprising an array of electrically conductive leads 14 and a through hole 120 hosting a glass window on a bottom surface of the support 12. FIG. 14 is a flipped perspective view of the package of FIG. 13, showing a backside 12a of the planar support 12 with the glass window 120.

Figure 15:
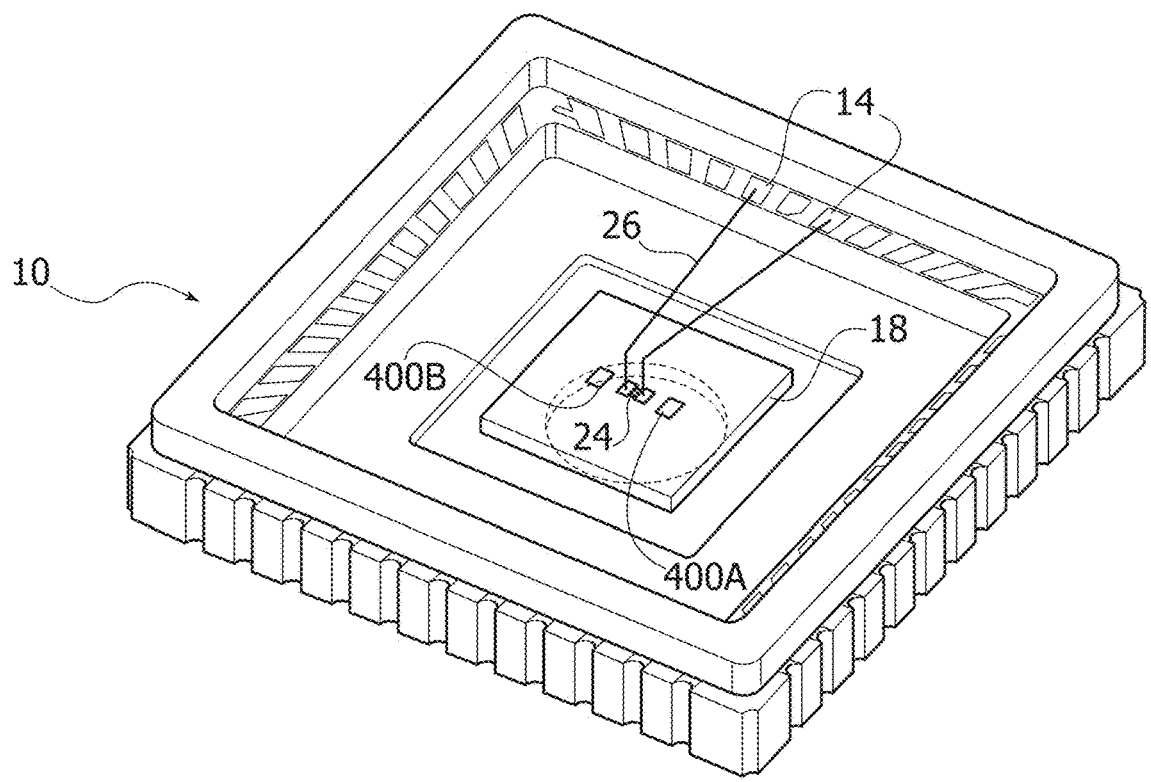
FIGS. 15, 16 and 17 are perspective views of an optomechanical assembly as per the present disclosure.

As exemplified in FIG. 15, the assembly 10 may be placed and attached (e.g., glued) over the glass window 120, with a portion of the optical chip layer 18 exposed or aligned therewith. As exemplified in FIGS. 15 and 17, wire bonding may be performed to electrically couple bond pads 24 coupled to the membrane 22 and the array of leads 14 in the support 12, for electrical connection between the optomechanical assembly 10 and the outside of the package.

Figure 16:
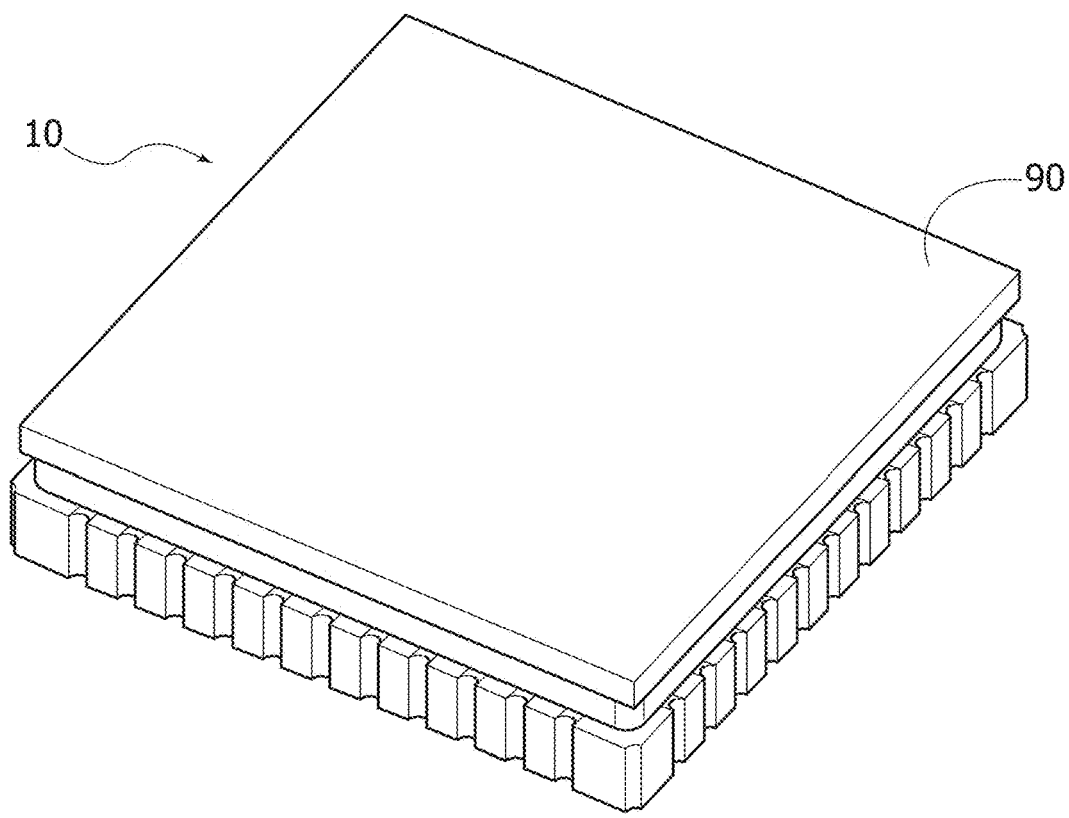

In one or more embodiments as exemplified in FIG. 16, a protective lid 90 may be attached to the package support 12, sealing the volume therein so that the chip assembly 100 is protected from external environment.

Figure 17:
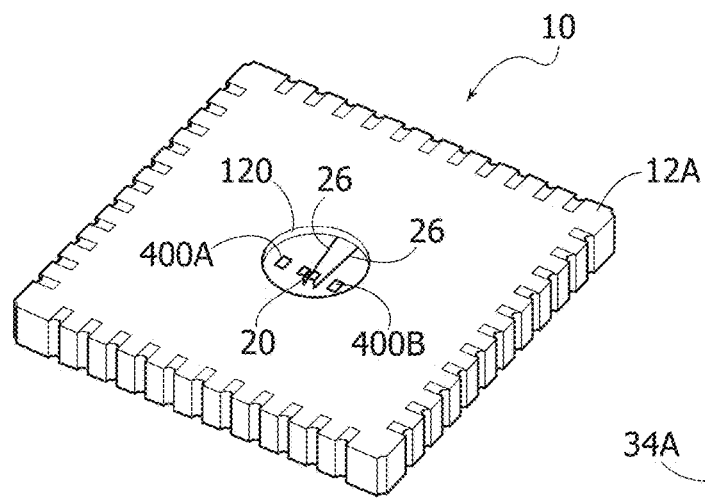

FIG. 17 shows the backside 12a of the support 12 with the membrane 20 and reference surfaces 400A, 400B visible from the optically transparent glass window 120.

Figure 18:
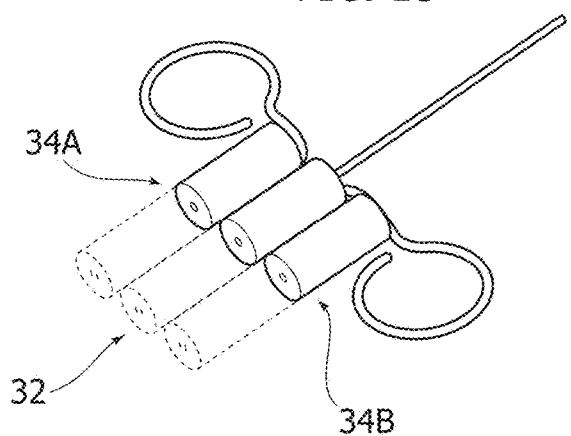
FIG. 18 is a perspective view of an optical element as per the present disclosure.

FIG. 18 is a perspective view of the optical component 30 which may comprise set of three optical fibers 32, 34A, 34B, inserted inside a same optical fiber block 30 or coupled therebetween via a mechanical holder (not visible in the figure).

Figure 19:
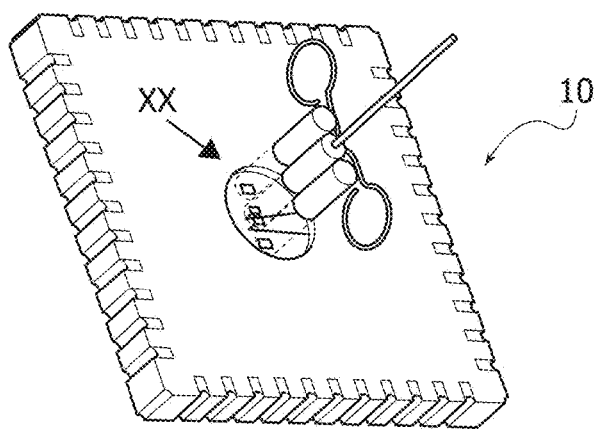
FIG. 19 is a perspective view of an apparatus as per present disclosure.

Aligning the optical element 30 to the membrane 20 may comprise coupling the free output ends of the optical element 30 to the window 120 of the package 12 at the side of the window 120 exposed on the back of the package 12, as exemplified in FIG. 19.

Figure 20:
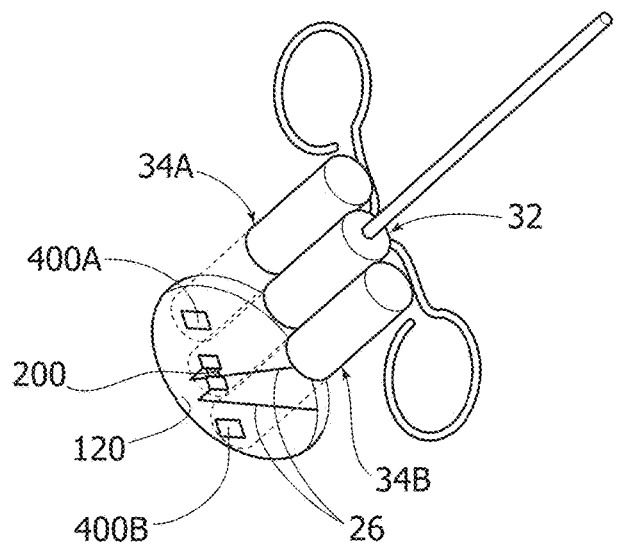
FIG. 20 is an enlarged view essentially along arrow XX of FIG. 19.

FIG. 20 shows an enlarged view of the portion indicated by arrow XX of FIG. 19.

In an arrangement as illustrated herein, a process of aligning δc, δf the optical element 30 with respect to the membrane 20 before fixedly coupling the element 30 to the window 120 may comprise:
transmitting S a pair of collimating light beams BSc towards the reflecting reference surfaces 400A, 400B while transmitting a focusing light beam BSf towards the membrane 20;
receiving 31 a back-reflected light signal R from the reflective surfaces 40, 400, 400A, 400B, 200; and
varying, for instance via actuators A, a position of the optical element 30 with respect to the glass window 120 (and to the membrane 20) as a function of the back-reflected signal R.

As a result, it is possible align δc, δf the collimating lenses 34A, 34B to the reference surfaces 400A, 400B.

Since the position of the reference reflective surfaces 400A, 400B is known with respect to the working area of the membrane 20 and since the optical fibers 32, 34A, 34B are aligned to each other as a result of being integrated 30, the focusing portion 32 is aligned by design to the working area of the membrane 20.

An apparatus (for instance, 10) may comprise:
an optically transparent substrate (for instance, 18) having a first surface and a second surface opposed the first surface;
a piezoelectric membrane (for instance, 20) arranged at the first surface of the optically transparent substrate, the piezoelectric membrane configured to oscillate as a result of light propagated through the optically transparent substrate impinging onto the piezoelectric membrane, wherein at least one reflective facet (for instance, 40, 400A, 400B) facing the optically transparent substrate is provided at the piezoelectric membrane; and
an optical element (for instance, 30) configured to receive a light beam at an input end and to guide the light beam towards an output end couplable to the second surface of the optically transparent substrate;
wherein the optical element incorporates: a light focusing path (for instance, 32) configured to focus (for instance, 320) a light beam at a focal point (for instance, FP) at the piezoelectric membrane, and at least one light collimating path (for instance, 34, 34A, 34B) configured to collimate (for instance, 340) the light beam onto the at least one reflective facet;
wherein the optical element is configured to guide light reflected (for instance, R, 31) from the at least one reflective facet to the input end; and
wherein the light reflected to the input end is indicative of the position (for instance, δc, δf) of the optical element with respect to the focal point.

In an apparatus as exemplified herein:
the piezoelectric membrane may comprise the at least one reflective facet (for instance, 40), the at least one reflective facet having a central area (for instance, 200) and a peripheral area (for instance, 400), and
the light focusing path in the optical element is configured to focus the light beam at the central area (for instance, 200, FP) of the at least one reflective facet, and the at least one light collimating path in the optical element is configured to collimate (for instance, 340) the light beam at the peripheral area of the at least one reflective facet.

An apparatus as exemplified herein may comprise a plurality of the reflective facets (400A, 400B), and in such an apparatus the optical element may incorporate a plurality of light collimating paths (for instance, 34A, 34B) configured to provide respective light beams collimated (for instance, 340) onto the plurality of reflective facets.

In an apparatus as exemplified herein, the plurality of reflective facets may comprise reflective facets arranged at a same distance (for instance, H) from a center (for instance, FP) of the piezoelectric membrane.

In an apparatus as exemplified herein, the plurality of reflective facets comprises two facets arranged mirror-symmetrical from a center of the piezoelectric membrane.

In an apparatus as exemplified herein, the plurality of reflective facets may comprise:
square facets with a side length (for instance, C) between about 250 and about 300 microns, and/or
facets at a distance (for instance, H) of about 300 microns from a center of the piezoelectric membrane.

In an apparatus as exemplified herein, the optical element may comprise:
a substrate (for instance, 60) having a plurality of channels (for instance, 600) formed therein,
a plurality of optical fibers (for instance, 32, 34, 34A, 34B) arranged in the channels (for instance, 600), and
the optical fibers (for instance, 32, 34, 34A, 34B) providing the light focusing path (for instance, 32) and the at least one light collimating path (for instance, 34, 34A, 34B).

In an apparatus as exemplified herein:
the light focusing path in the optical element may comprise a light focusing gradient index, GRIN, lens (for instance, 320) with a focusing pitch (for instance, Pf), and
the at least one light collimating path in the optical element comprises a light collimating GRIN lens (for instance, 34A, 34B) having a collimating pitch (for instance, Pc), and the light focusing and light collimating paths may have a same total length (for instance, $L_o$) and a same lens diameter (for instance, E).

In an apparatus as exemplified herein, at least one of the light focusing path and of the at least one light collimating path in the optical element may include an optical spacer portion (for instance, 322, 342).

In an apparatus as exemplified herein, the same total length may be about 500 microns, and/or the same lens diameter may be about 350 microns.

In an apparatus as exemplified herein the apparatus may comprise a housing (for instance, 12, 90) having a support base (for instance, 12) with a through hole (for instance, 120) therein, the support base of the housing being coupled to the second surface of the optically transparent substrate with a portion of the second surface of the optically transparent substrate aligned with the through hole; and the output end of the optical element is coupled to the optically transparent layer at the through hole in the support base of the housing.

A method as exemplified herein may comprise:
launching (for instance, S) into the input end of the optical element (for instance, 30) of an opto-mechanical apparatus (for instance, 10) as exemplified herein, a light beam aimed at the at least one reflective facet (for instance, 40, 400A, 400B);

sensing (for instance, 31) light (for instance, R) reflected towards the input end of the optical element (for instance, 30); and aligning (for instance, A) the optical element with respect to the focal point (for instance, FP) at the piezoelectric membrane (for instance, 20) of the apparatus (10) as a function of the reflected light sensed.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

What is claimed is:

1. An apparatus, comprising:
   an optically transparent substrate having a first surface and a second surface opposed to the first surface;
   a piezoelectric membrane arranged at the first surface of the optically transparent substrate, the piezoelectric membrane configured to oscillate as a result of a light beam propagated through the optically transparent substrate and impinging onto the piezoelectric membrane, wherein at least one reflective facet facing the optically transparent substrate is arranged at the piezoelectric membrane; and
   an optical element configured to receive the light beam at an input end and to guide the light beam towards an output end coupled to the second surface of the optically transparent substrate;
   wherein the optical element incorporates:
      a light focusing path configured to focus the light beam at a focal point at the piezoelectric membrane; and
      at least one light collimating path configured to collimate the light beam onto the at least one reflective facet;
   wherein the optical element is configured to guide light reflected from the at least one reflective facet to the input end; and
   wherein the light reflected to the input end is indicative of a position of the optical element with respect to the focal point.

2. The apparatus of claim 1, wherein:
   the piezoelectric membrane comprises the at least one reflective facet, the at least one reflective facet having a central area and a peripheral area;
   the light focusing path in the optical element is configured to focus the light beam at the central area of the at least one reflective facet; and
   the at least one light collimating path in the optical element is configured to collimate the light beam at the peripheral area of the at least one reflective facet.

3. The apparatus of claim 1, further comprising:
   a plurality of the reflective facets;
   wherein the optical element incorporates a plurality of light collimating paths configured to provide respective light beams collimated onto the plurality of the reflective facets.

4. The apparatus of claim 3, wherein the plurality of the reflective facets comprises reflective facets arranged at a same distance from a center of the piezoelectric membrane.

5. The apparatus of claim 4, wherein the plurality of the reflective facets comprises:
   square facets with a side length between about 250 and about 300 microns; and/or
   facets at a distance of about 300 microns from the center of the piezoelectric membrane.

6. The apparatus of claim 3, wherein the plurality of the reflective facets comprises two facets arranged mirror-symmetrical from a center of the piezoelectric membrane.

7. The apparatus of claim 1, wherein the optical element comprises:
   a substrate having a plurality of channels formed therein; and
   a plurality of optical fibers arranged in the channels;
   wherein the optical fibers provide the light focusing path and the at least one light collimating path.

8. The apparatus of claim 1, wherein:
   the light focusing path in the optical element comprises a light focusing gradient index (GRIN) lens with a focusing pitch; and
   the at least one light collimating path in the optical element comprises a light collimating GRIN lens having a collimating pitch, and the light focusing and light collimating paths have a same total length and a same lens diameter.

9. The apparatus of claim 8, wherein at least one of the light focusing path and of the at least one light collimating path in the optical element includes an optical spacer portion.

10. The apparatus of claim 8, wherein:
    the same total length is about 5.35 millimeters; and/or
    the same lens diameter is about 350 microns.

11. The apparatus of claim 1, wherein:
    the apparatus further comprises a housing having a support base with a through hole therein, the support base of the housing being coupled to the second surface of the optically transparent substrate with a portion of the second surface of the optically transparent substrate aligned with the through hole; and
    the output end of the optical element is coupled to the optically transparent substrate at the through hole in the support base of the housing.

12. A method of operating an opto-mechanical apparatus comprising an optically transparent substrate having a first surface and a second surface opposed to the first surface, a piezoelectric membrane arranged at the first surface, at least one reflective facet facing the substrate arranged at the piezoelectric membrane, and an optical element having an input end, and an output end coupled to the second surface of the optically transparent substrate, the method comprising:
   receiving, by the input end of the optical element, a light beam directed toward the at least one reflective facet;
   guiding, by the optical element, the light beam towards the output end of the optical element;
   oscillating, by the piezoelectric membrane, in response to the light beam propagating through the optically transparent substrate and impinging onto the piezoelectric membrane;
   guiding, by the optical element, light reflected from the at least one reflective facet to the input end of the optical element;
   sensing the light reflected to the input end of the optical element; and
   aligning the optical element with respect to a focal point at the piezoelectric membrane as a function of the sensed reflected light.

13. The method of claim 12, wherein the guiding the light beam towards the output end comprises:
   focusing, by a light focusing path of the optical element, the light beam at the focal point at the piezoelectric membrane.

14. The method of claim 13, wherein the guiding the light beam towards the output end further comprises:
   collimating, by at least one light collimating path of the optical element, the light beam onto the at least one reflective facet.

15. The method of claim 14, wherein the piezoelectric membrane comprises the at least one reflective facet, the at least one reflective facet has a central area and a peripheral area, and the method further comprises:
   focusing, by the light focusing path, the light beam at the central area of the at least one reflective facet; and
   collimating, by the at least one light collimating path, the light beam at the peripheral area of the at least one reflective facet.

16. The method of claim 14, wherein the optical element comprises a plurality of optical fibers arranged in a plurality of channels, and the method further comprises:
   providing, by the optical fibers, the light focusing path and the at least one light collimating path.

17. The method of claim 12, wherein the apparatus comprises a plurality of the reflective facets, and the method further comprises:
   collimating, by a plurality of light collimating paths of the optical element, respective light beams onto the plurality of the reflective facets.

18. The method of claim 17, wherein the plurality of the reflective facets comprises reflective facets arranged at a same distance from a center of the piezoelectric membrane.

19. The method of claim 18, wherein the plurality of the reflective facets comprises:
   square facets with a side length between about 250 and about 300 microns; and/or
   facets at a distance of about 300 microns from the center of the piezoelectric membrane.

20. The method of claim 17, wherein the plurality of the reflective facets comprises two facets arranged mirror-symmetrical from a center of the piezoelectric membrane.

21. An apparatus, comprising:
   an optically transparent substrate comprising:
      a first surface; and
      a second surface opposite the first surface;
   a piezoelectric membrane disposed at the first surface of the optically transparent substrate;
   at least one reflective facet disposed at the piezoelectric membrane or in a same plane by a side of the piezoelectric membrane, and facing the optically transparent substrate; and
   an optical element comprising:
      an input end configured to receive a light beam;
      an output end coupled to the second surface of the optically transparent substrate;
      a light focusing lens having a focal point for the light beam at the piezoelectric membrane; and
      a light collimating lens oriented to collimate the light beam onto the at least one reflective facet for reflection back to the input end.

22. The apparatus of claim 21, wherein:
   the piezoelectric membrane comprises the at least one reflective facet, the at least one reflective facet having a central area and a peripheral area;
   the light focusing lens has the focal point for the light beam at the central area of the at least one reflective facet; and
   the light collimating lens is oriented to collimate the light beam at the peripheral area of the at least one reflective facet.

23. The apparatus of claim 21, further comprising:
   a plurality of the reflective facets;
   wherein the optical element incorporates a plurality of light collimating lenses oriented to collimate respective light beams onto the plurality of the reflective facets.

24. The apparatus of claim 21, wherein the optical element comprises:
   a substrate having a plurality of channels formed therein; and
   a plurality of optical fibers arranged in the channels;
   wherein a first optical fiber of the optical fibers comprises the light focusing lens; and
   a second optical fiber of the optical fibers comprises the light collimating lens and a second optical spacer portion.

25. The apparatus of claim 21, wherein:
   the light focusing lens is a light focusing gradient index (GRIN) lens with a focusing pitch; and
   the light collimating lens is a light collimating GRIN lens having a collimating pitch, and wherein the light focusing lens and the light collimating lens have a same lens diameter.

26. The apparatus of claim 21, wherein:
   the apparatus further comprises a housing having a support base with a through hole therein, the support base of the housing being coupled to the second surface of the optically transparent substrate with a portion of the second surface of the optically transparent substrate aligned with the through hole; and
   the output end of the optical element is coupled to the optically transparent substrate at the through hole in the support base of the housing.

* * * * *